United States Patent
Lee

(10) Patent No.: US 10,275,374 B2
(45) Date of Patent: Apr. 30, 2019

(54) METHOD FOR CONTROLLING INTERRUPT IN INVERTER

(71) Applicant: LSIS CO,. LTD., Gyeonggi-do (KR)

(72) Inventor: Bong-Ki Lee, Gyeonggi-do (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 166 days.

(21) Appl. No.: 15/463,674

(22) Filed: Mar. 20, 2017

(65) Prior Publication Data

US 2018/0137068 A1    May 17, 2018

(30) Foreign Application Priority Data

Nov. 14, 2016 (KR) .................. 10-2016-0150879

(51) Int. Cl.
| | | |
|---|---|---|
| G06F 9/04 | (2006.01) | |
| G06F 13/26 | (2006.01) | |
| G06F 13/24 | (2006.01) | |
| H02M 5/458 | (2006.01) | |
| H02M 7/5387 | (2007.01) | |
| H02M 1/00 | (2006.01) | |

(52) U.S. Cl.
CPC .............. *G06F 13/26* (2013.01); *G06F 13/24* (2013.01); *H02M 5/458* (2013.01); *H02M 7/53873* (2013.01); *H02M 2001/0012* (2013.01)

(58) Field of Classification Search
None
See application file for complete search history.

(56) References Cited

U.S. PATENT DOCUMENTS

| | | | | |
|---|---|---|---|---|
| 4,618,810 A | * | 10/1986 | Hagerman | H02P 27/06 318/798 |
| 7,340,547 B1 | | 3/2008 | Ledebohm | |
| 2006/0072263 A1 | | 4/2006 | Deng et al. | |

FOREIGN PATENT DOCUMENTS

| | | |
|---|---|---|
| EP | 2045904 A2 | 4/2009 |
| JP | H0934753 A | 2/1997 |
| JP | H11210635 A | 8/1999 |
| JP | 2001016868 A | 1/2001 |
| JP | 2004110120 A | 4/2004 |
| JP | 2005218213 A | 8/2005 |
| JP | 2007049770 A | 2/2007 |
| JP | 2012208567 A | 10/2012 |
| KR | 100192526 B1 | 6/1999 |
| KR | 101079898 B1 | 11/2011 |

OTHER PUBLICATIONS

Intel, 8080/8085 Assembly Language Programming, 1977, Intel, pp. 1-224.*

(Continued)

*Primary Examiner* — Cheng Yuan Tseng
(74) *Attorney, Agent, or Firm* — K&L Gates LLP

(57) ABSTRACT

Disclosed herein is a method for controlling interrupts in an inverter. If a control unit checks that an interrupt is issued in main software while an inverter is operating, the control unit analyzes the type of the interrupt. The interrupt is converted into an interrupt ID sorted by functionality. If the interrupt ID is a previously registered interrupt ID, an interrupt function corresponding to the registered interrupt ID is executed.

5 Claims, 5 Drawing Sheets

(56) References Cited

OTHER PUBLICATIONS

Japanese Office Action for related Japanese Application No. 2017-050173; action dated Dec. 12, 2017; (4 pages).
European search report dated Aug. 28, 2017 for corresponding EP application 17159537.4.
ARM; "Migrating a software application from ARMv5 to ARMv7-A/R Version: 1.0, Application Note 425"; 2014; (94 pages).
Nilesh Kumbhar, et al.; "Variable Frequency Drive by Using ARM Controller"; International Journal of Innovative Research in Electrical, Electronics, Instrumentation and Control Engineering vol. 4, Issue 3; Mar. 2016; (3 pages).
Korean Office Action for related Korean Application No. 10-2016-0150879; action dated Jul. 31, 2018; (5 pages).

* cited by examiner

METHOD FOR CONTROLLING INTERRUPT IN INVERTER

CROSS-REFERENCE TO RELATED APPLICATIONS

This application claims the priority of Korean Patent Application No. 10-2016-0150879 filed on Nov. 14, 2016, in the Korean Intellectual Property Office, the disclosure of which is hereby incorporated by reference in its entirety.

BACKGROUND

1. Technical Field

The present disclosure relates to a method for controlling interrupts in an inverter.

2. Description of the Related Art

Typically, an inverter receives AC mains electricity to converter it into a DC power, and then converts it again into an AC power suitable for electric motors to supply it. Such an inverter effectively controls an electric motor, thereby reducing the power consumption of the motor to improve energy efficiency. Since more than 50% of the world's electricity is currently consumed by electric motors, it is necessary to reduce electricity consumption by increasing energy efficiency with such inverters. Electric motors have different capacities depending on their use and size, and accordingly inverters have been developed to have different capacities.

Incidentally, an embedded system refers to a solution that is added a certain product or solution and is programmed to perform a specific task in the product. Currently, such an embedded market is getting bigger with issues related to internet of things (IoT) and smart factories. Accordingly, semiconductor companies are now competitively releasing their microcontroller units (MCUs) for embedded applications.

An interrupt is one of the most important functionalities in embedded software. An interrupt, in embedded software, refers to notifying an MCU that a process is necessary on I/O hardware or when an abnormal situation to be processed takes place while the MCU is executing a program, and automatically stopping the execution of a main program to execute an interrupt program.

Unfortunately, the types and names of such interrupts differ from the manufacturer's cores or MCU series. Therefore, it is necessary to change the interrupt software depending on the MCU, and it is difficult to communicate between developers using different MCUs. This will be described in detail with reference to the drawings.

FIGS. 1A and 1B are diagrams for illustrating an interrupt of existing embedded software. It can be seen from the drawings that even in the embedded software of the same inverter, names and structures of the functions differ from the issued interrupts.

As shown in FIG. 1A, main software 100 causes an interrupt function for calculating a pulse width modulation (PWM) output ISR_pwmb( ) to be processed by an interrupt issued according to a PWM carrier QEP interrupt, such that the interrupt function for calculating the PWM output ISR_pwmb( ) performs the PWM output operation. In addition, the main software 100 causes an interrupt function to be executed every 1 msec ISR_SW1 msec( ) to be processed by an interrupt issued according to a timer count (timer interrupt), such that the inverter output frequency, the auto tuning, the inverter output voltage, inverter time, etc. are calculated. In addition, the main software 100 causes an interruption function for performing PWM PDP ISR_PwmTrip1( ) to be processed by a PWM external interrupt signal (PDP interrupt), such that overcurrent and arm short are detected and overcurrent is suppressed.

As shown in FIG. 1B, the main software 100 causes an interrupt function for calculating a PWM output ISR_pwmb ( ) to be processed by an PWM upload interrupt (PWM interrupt), such that the interrupt function for calculating the PWM output ISR_pwmb( ) performs the PWM output operation. In addition, the main software 100 causes an interrupt function to be executed every 1 msec ISR_SW1 msec( ) to be processed by a timer counter interrupt (timer interrupt), such that the interrupt function ISR_SW1 msec ( ) calculates the inverter output frequency, the auto tuning, the inverter output voltage, inverter time, etc. Further, the main software 100 causes an arm short detection interrupt function ISR_PwmTrip1( ) to be processed by a first trip zone interrupt PWM trip 1 interrupt, such that the arm short can be detected. In addition, the main software 100 causes an overcurrent detection interrupt function ISR_PwmTrip2 ( ) to be processed by a second trip zone interrupt PWM trip 2 interrupt, such that the overcurrent can be detected. Further, the main software 100 causes an overcurrent suppression detection interrupt function ISR_PwmTrip3( ) to be processed by a third trip zone interrupt PWM trip 3 interrupt, such that the arm short can be detected.

As such, previously, functions were registered with interrupts defined in the MCU, and the programs were directly executed. Therefore, the interrupt functions were merged, separated or redefined whenever the central processor unit (CPU) of the inverter was changed, and the application programs had to be modified due to the change of the interrupt functions.

In particular, in some main programs, interrupts are issued irrespectively of whether the top or bottom of the PWM, while in other main programs, interrupts are issued at the top and bottom separately. Therefore, there are problems that the it is difficult to reuse the programs, and different interrupts are required for different inverters.

In addition, as shown in FIGS. 1A and 1B, the name and structure of the interrupt functions having the same functionality differ from inverters, and thus it is difficult to know what function is performed only with the interrupt function. As a result, there is a problem that it is difficult to analyze the software.

In addition, when a single interrupt function performs several functionalities, the code complexity increases to thereby deteriorate the quality of the software. In addition, when a functionality is added or deleted, the code reference diagram becomes complicated.

As a result, this leads to deterioration of the inverter quality, and the development time of the inverter software becomes longer.

SUMMARY

It is an object of the present disclosure to provide a method for controlling interrupts in an inverter, by which interrupts are abstracted by their functionality in embedded software in an inverter to implement software irrespectively of MCUs, thereby increasing reusability of the software to shorten the development time and improving the code quality.

It is another object of the present disclosure to provide a method for controlling interrupts in an inverter, by which the software execution efficiency is increased by determining whether to perform an interrupt function according to whether the function is used or not.

In accordance with one aspect of the present disclosure, a method for controlling an interrupt issued in an inverter, the method performed by a control unit 10 includes: executing main software while an inverter is operating; checking if an interrupt is issued while the inverter is operating; analyzing a type of the interrupt issued in the main software; converting the interrupt into the interrupt ID sorted by functionality; and if the interrupt ID is a previously registered interrupt ID, executing an interrupt function corresponding to the registered interrupt ID.

The analyzing the type of the interrupt may include analyzing in which state the main software 41 was when the interrupt 42 has been issued.

The method may further include: returning to executing the main software if the interrupt ID is not a registered interrupt ID.

The method may further include: determining whether functionality of the interrupt ID 44 is enable.

The method may further include: returning to the executing the main software 41 if the functionality of the interrupt ID 44 is disable.

The method may further include: storing interrupt IDs sorted by functionality and the respective interrupt functions separately.

According to an exemplary embodiment of the present disclosure, interrupts typically defined by MCUs are converted into interrupt IDs sorted by functionality, such that software can be implemented irrespectively of the MCUs. As a result, the time taken to develop software can be shortened.

Further, according to an exemplary embodiment of the present disclosure, when various functionalities are executed in one function for interrupts of the same MCU, the quality of software can be improved by separating functions by functionality.

Further, according to an exemplary embodiment of the present disclosure, it is possible to improve the execution efficiency of software by determining whether to execute the interrupt function dependent on whether to use (enable) it.

DETAILED DESCRIPTION

Figure 1A:
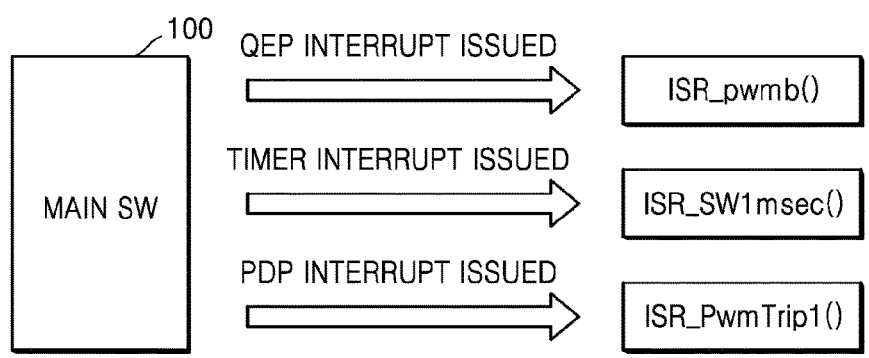
FIGS. 1A and 1B are diagrams for illustrating interrupts in existing embedded software.
Figure 1B:
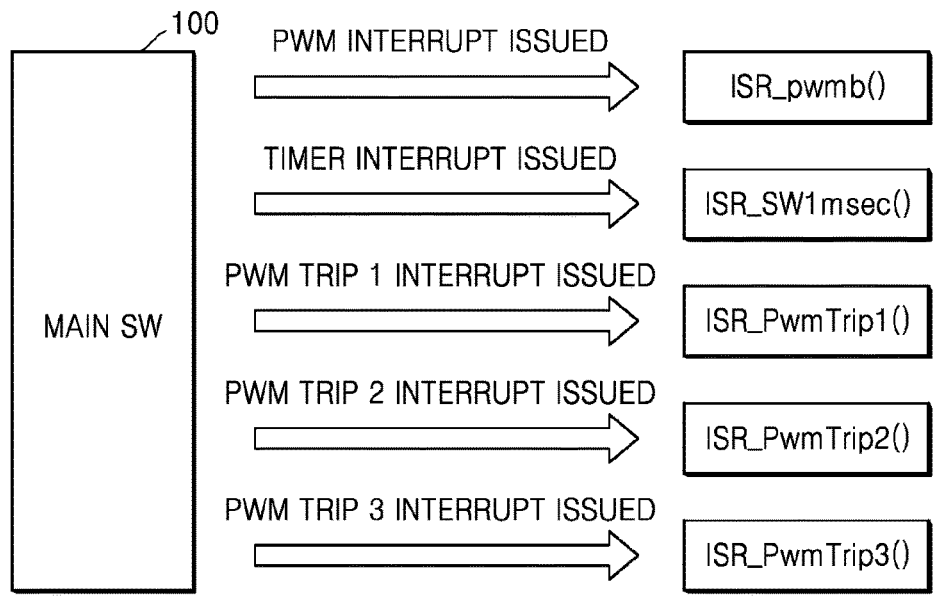

Exemplary embodiments of the present disclosure will now be described in detail with reference to the accompanying drawings to facilitate understanding of the configuration and effects thereof. The scope of the present disclosure may, however, be embodied in many different forms and should not be construed as limited to the embodiments set forth herein. These embodiments are provided so that this disclosure will be thorough and complete, and will fully convey the scope of the inventive subject matter to those skilled in the art. In the drawings, the size of some of the elements may be exaggerated for convenience of illustration and not drawn on scale for illustrative purposes.

It will be understood that when an element such as a layer, region, substrate, or panel is referred to as being "on" or "connected to" another element, it can be directly on the other element or intervening elements may also be present. In contrast, when an element is referred to as being "directly on" or "directly connected to" another element, there are no intervening elements present. The same may be applied to other expressions for describing relationship between elements such as "between" and "directly between".

Terms such as first, second, etc. in the description and in the claims are used for distinguishing between similar elements and not necessarily for describing a sequential or chronological order. For example, the terms so used are interchangeable under appropriate circumstances without departing from the scope of the present disclosure.

As used herein, the singular form of "a," "an," and "the" include plural references unless the context clearly dictates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

The terms used herein, including technical terms, have the same meanings as terms that are generally understood by those skilled in the art, as long as the terms are not explicitly defined differently.

Hereinafter, exemplary embodiments of the present disclosure will be described in detail with reference to the accompanying drawings.

Figure 2:
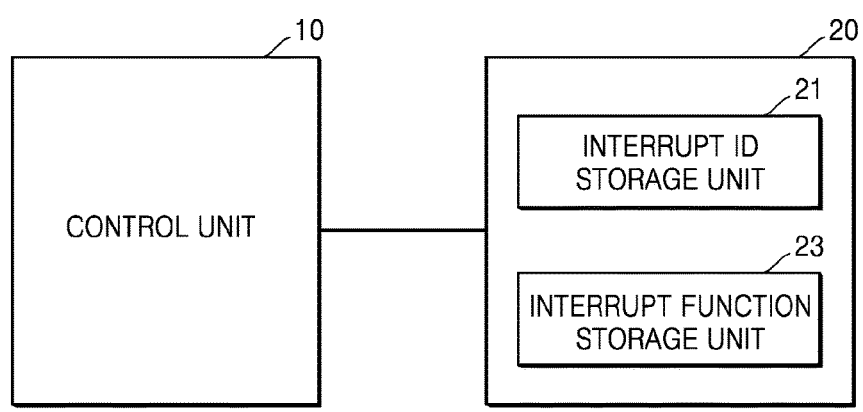
FIG. 2 is a diagram illustrating an apparatus for managing interrupts by functionality of inverter embedded software according to an exemplary embodiment of the present disclosure.

FIG. 2 is a diagram illustrating an apparatus for managing interrupts in inverter embedded software by functionality according to an exemplary embodiment of the present disclosure.

As shown in FIG. 2, the apparatus according to the exemplary embodiment of the present disclosure may include a control unit 10 and a storage unit 20. The storage unit 20 may include an interruption ID storage unit 21 and an interruption function storage unit 23. The interrupt ID storage unit 21 may store therein interrupt IDs sorted by functionality used for the specific task. The interrupt function storage unit 23 may store therein interrupt functions for different functionalities. For each of the functionalities, the interrupt ID and the respective interrupt function may be stored in association with each other. Although the interrupt ID storage unit 21 and the interrupt function storage unit 23 are depicted as separate components, they may be configured as a single component so that they correspond to each function.

In addition, according to an exemplary embodiment of the present disclosure, the storage unit 20 may include only one of the interrupt ID storage unit 21 and the interrupt function storage unit 23. For example, the storage unit 20 may include only the interrupt ID storage unit 21, and the interrupt function storage unit 23 may exist separately from the storage unit 20. In the following description, for convenience of illustration, it is assumed that the storage unit 20 includes the interrupt ID storage unit 21 as well as the interrupt function storage unit 23.

The control unit 10 performs a method for managing interrupts by functionality according to an exemplary embodiment of the present disclosure. For example, the control unit 10 may be a microcontroller (MCU) or a central processing unit (CPU). Hereinafter, the operation of the control unit 10 will be described in detail with reference to the drawings.

Figure 3:
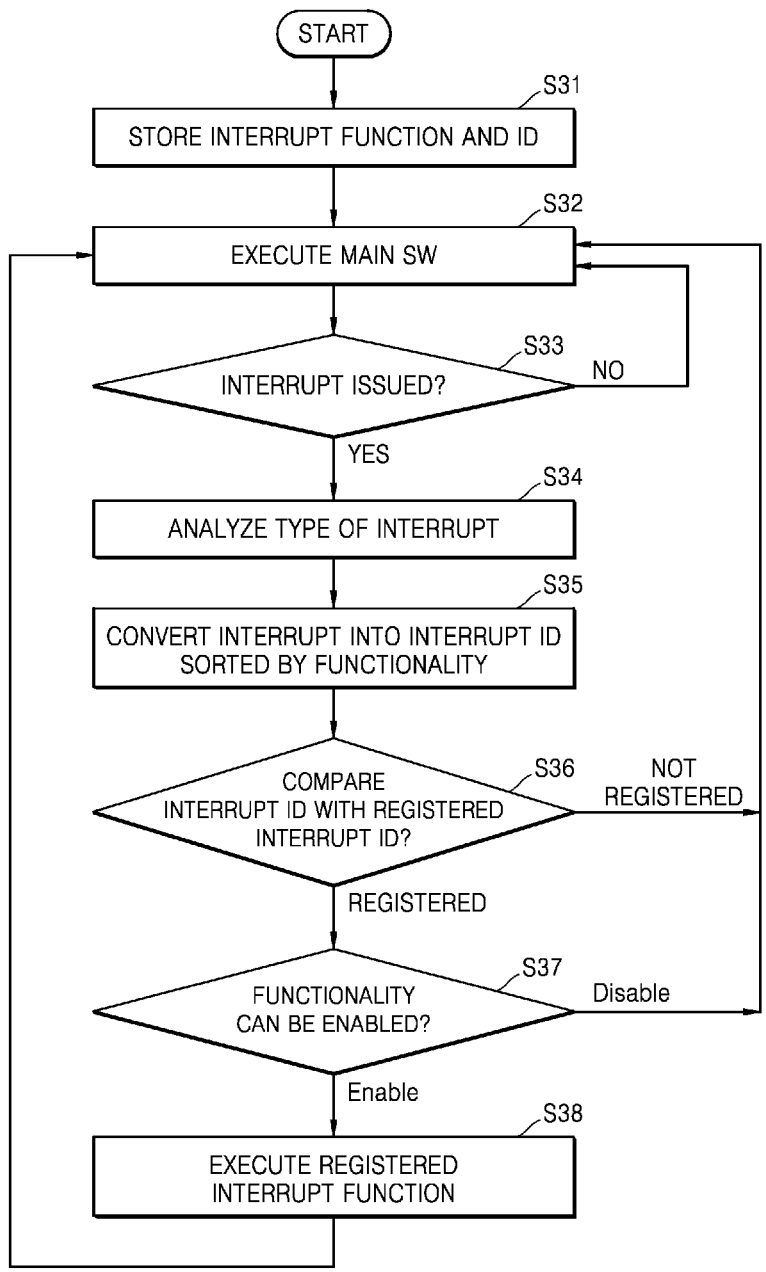
FIG. 3 is a flowchart for illustrating a method for managing interrupts in inverter embedded software by functionality according to an exemplary embodiment of the present disclosure.

FIG. 3 is a flowchart for illustrating a method for managing interrupts by functionality in inverter embedded software according to an exemplary embodiment of the present disclosure. FIG. 2 focuses on the operation of the control unit 10.

Referring to FIGS. 2 and 3, the control unit 10, upon receiving a user's input, may store interrupt IDs and the interrupt functions sorted by the functionalities each used for the specific task in an inverter in the interrupt ID storage unit 21 and the interrupt function storage unit 21, respectively (step S31).

Subsequently, the control unit 10 executes main software when the inverter operates (step S32). If it is checked that an interrupt is issued (step S33), the control unit 10 may analyze the type of the interrupt and the current state of the software (step S34). Specifically, if an interrupt is issued, the control unit 10 may analyze what kind of interrupt has been issued and in which state the main software was when the interrupt has been issued, thereby determining which interrupt to generate.

The type of the interrupt may include, for example, an interrupt issued according to a pulse width modulation (PWM) carrier, an interrupt issued according to a timer count, a PDP interrupt as a PWM external interrupt signal, a PWM upload interrupt, an arm short detection interrupt, an overcurrent detection interrupt, and an overcurrent suppression detection interrupt. As listed above, the interrupts analyzed by the control unit 10 may include a variety of types. To analyze the type of an interrupt, the control unit 10 may receive a signal from a counter (not shown) or may detect it by itself.

Subsequently, the control unit 10 converts the interrupt into interrupt ID sorted by functionality (step S35), and may check if the converted interrupt ID is stored (that is, registered) in the interrupt ID storing unit 21 (step S36). That is, the control unit 10 may compare the converted interrupt ID with the interrupt ID previously registered with the interrupt ID storage unit 21. If it is determined that the interrupt ID is not registered with the interrupt ID storage unit 21, the interrupt ID is ignored since the functionality of the interrupt is not used one, and the process may return to the step S32 of executing the main software. If it is determined that the interrupt ID is one registered with the interrupt ID storage unit 21, it may be determined whether the corresponding functionality can be enabled (step S37). Interrupt enable is the ability to re-enable intermittently disabled interrupts for critical processing tasks that should not be interrupted while the main software is running. A state in which an interrupt is accepted after returning to a normal state is referred to as interrupt enable. The control unit 10 may receive interrupt enable during execution of the main software as an external signal or by a user's selection. At this time, if it is interrupt disable, the process may return to step S32 to executing the main software again. If it is interrupt enable, an interrupt function stored (i.e., registered) in the interrupt function storage unit 23 may be executed (step S38).

Figure 4:
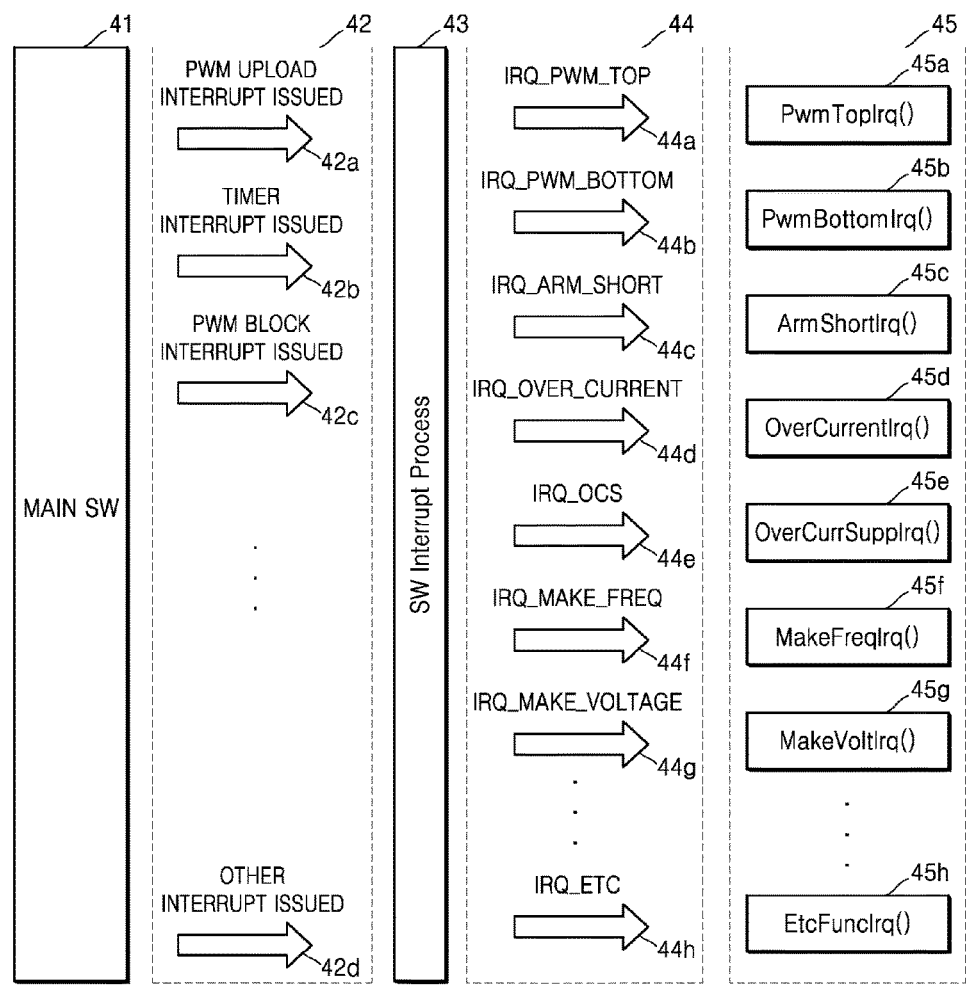
FIG. 4 is a diagram for illustrating an application of an exemplary embodiment of the present disclosure.

FIG. 4 is a diagram for illustrating an application of an exemplary embodiment of the present disclosure.

Referring to FIGS. 2 and 4, various kinds of interrupts 42 such as a PWM upload interrupt 42a, a timer interrupt 42b, a PWM block interrupt 42c are issued during execution of the main software 41, the control unit 10 starts interrupt management 43 according to an exemplary embodiment of the present disclosure. That is, the control unit 10 analyzes the interrupts to convert them into interrupt IDs 44 sorted by functionality.

By using the interrupt ID thus converted, the control unit 10 may execute an interrupt function 45 corresponding to the interrupt ID. In an exemplary embodiment of the present disclosure, for example, when a PWM upload interrupt is issued as indicated by arrow 42a, the control unit 10 checks that an interrupt has been issued at the top TOP of the PWM and converts the interrupt into an interrupt ID of IRQ_PWM_TOP as indicated by arrow 44a. Then, the corresponding function of PwmTopIrq ( ) indicated by 45a can be executed. That is, the interrupt function corresponding to the interrupt ID can be easily executed.

Although various interrupt IDs and corresponding interrupt functions according to an exemplary embodiment of the present disclosure are illustrated. It is to be understood that they are merely illustrative but is not limiting.

In this manner, according to an exemplary embodiment of the present disclosure, interrupts typically defined by MCU are converted into interrupt IDs sorted by functionality, such that software can be implemented irrespectively of the MCU. As a result, the time taken to develop software can be shortened.

Further, according to an exemplary embodiment of the present disclosure, when various functionalities are executed in one function for interrupts of the same MCU, the quality of software can be improved by separating functions by functionality.

Further, according to an exemplary embodiment of the present disclosure, it is possible to improve the execution efficiency of software by determining whether to execute the interrupt function dependent on whether to use (enable) it.

Although the exemplary embodiments of the present disclosure have been described in detail, these are merely illustrative. It will be appreciated by those skilled in the art that various modifications and equivalents are possible without departing from the scope of the present disclosure. Accordingly, the true scope of the present disclosure sought to be protected is defined only by the appended claims.

What is claimed is:

1. A method for controlling an interrupt, the method performed by a control unit and comprising:
    separately storing interrupt identifications (IDs) sorted by functionality and a respective interrupt function corresponding thereto, wherein each interrupt ID is used for a functionality to perform a specific task;
    executing main software while an inverter is operating;
    checking if an interrupt is issued while the inverter is operating;
    analyzing a type of the interrupt issued in the main software;
    converting the interrupt into the interrupt ID sorted by functionality; and
    if the interrupt ID is a previously stored interrupt ID, executing an interrupt function corresponding to the interrupt ID.

2. The method of claim 1, wherein the analyzing the type of the interrupt comprises analyzing in which state the main software was when the interrupt has been issued.

3. The method of claim 1, further comprising: returning to executing the main software if the interrupt ID is not a registered interrupt ID.

4. The method of claim 1, further comprising: determining whether functionality of the interrupt ID is enable.

5. The method of claim 4, further comprising: returning to the executing the main software if the functionality of the interrupt ID is disable.

\* \* \* \* \*